United States Patent [19]
Jabsen

[11] 3,894,327
[45] July 15, 1975

[54] INDUSTRIAL TECHNIQUE

[75] Inventor: Felix S. Jabsen, Lynchburg, Va.

[73] Assignee: The Babcock & Wilcox Company, New York, N.Y.

[22] Filed: Oct. 23, 1973

[21] Appl. No.: 408,767

[52] U.S. Cl................ 29/200 R; 29/400 N; 29/427; 174/78
[51] Int. Cl............................................. B23p 19/00
[58] Field of Search .......... 29/200 R, 200 B, 200 D, 29/200 J, 200 P, 400 N, 401, 427, 426, 428, 235, 244, 256, 263, 282; 176/78, 87, 76

[56] References Cited
UNITED STATES PATENTS

| | | | |
|---|---|---|---|
| 3,604,100 | 9/1971 | Tindale | 29/433 |
| 3,624,886 | 12/1971 | Powers et al. | 29/200 P |
| 3,665,586 | 5/1972 | Jabsen | 29/428 |
| 3,679,547 | 7/1972 | Warberg | 176/78 |
| 3,795,040 | 3/1974 | Jabsen | 29/433 |

*Primary Examiner*—C. W. Lanham
*Assistant Examiner*—James R. Duzan
*Attorney, Agent, or Firm*—J. M. Maguire, Esq.; J. P. Sinnott, Esq.

[57] ABSTRACT

An illustrative embodiment of the invention discloses a technique for disassembling a nuclear reactor fuel element without destroying the individual fuel pins and other structural components from which the element is assembled. A traveling bridge and trolley that span a water-filled spent fuel storage pool support a strongback. The strongback is under water and provides a working surface on which the spent fuel element is placed for inspection and for the manipulation that is associated with disassembly and assembly. To remove, in a non-destructive manner, the grids that hold the fuel pins in the proper relative positions within the element, bars are inserted through apertures in the grids with the aid of special tools. These bars are rotated to flex the adjacent grid walls and, in this way relax the physical engagement between protruding portions of the grid walls and the associated fuel pins. With the grid structure so flexed to relax the physical grip on the individual fuel pins, these pins can be withdrawn for inspection or replacement as necessary without imposing a need to destroy fuel element components.

1 Claim, 8 Drawing Figures

SHEET 4

INDUSTRIAL TECHNIQUE

BACKGROUND OF THE INVENTION

1. Field of the Invention

This invention relates to nuclear equipment and more particularly to methods and apparatus for the non-destructive inspection, manipulation, disassembly and assembly of reactor fuel elements, and the like. 2. Description of the Prior Art To generate power in a nuclear reactor, an adequate quantity of nuclear fuel or fissionable material must be concentrated in the reactor core. This concentration produces heat through a sustained sequence of reactions between neutrons and fissionable nuclei within the core. These fission processes, moreover, leave a residue of nuclear debris within the reactor core that is intensely radioactive.

In order to assemble a concentration of this nuclear fuel in a sufficient quantity to propagate the fission process, the fissionable material usually is pressed into pellets, which are loaded into and sealed within hollow metal rods or "pins". The individual pins ordinarily are assembled into a group that constitutes a "fuel elemtnt". An array of these fuel elements, when assembled in a side-by-side relation, generally constitute the active portion of the reactor core. Because of the high pressures, temperatures, and other hostile environmental conditions that often are encountered within a reactor core it is occasionally necessary to inspect the individual fuel pins to insure that they have not lost their structural integrity.

As a part of the fuel element construction, the individual pins are held in place through two end fixtures tht each engage respective pin extremities. cellular grids also are positioned at intervals along the tubular surfaces between the end fixtures in planes that are generally transverse to the longitudinal pin axes. Typically, these grids are rectangular arrays of interlocking metal plates. The arrays of interlocking plates thus form more or less cube-like cells that receive the individual fuel pins. Protrusions jut from the surfaces of the plates that form the cells. These protrusions engage the adjacent surfaces of the fuel pins and hold the respective pins rigidly in place. Because of the radioactivity that is induced in these fuel elements as a result of nuclear processes, it is necessary to dismantle used and partially used fuel elements under at least ten feet of water. The water, in this instance, provides radiation protection. Clearly, disassembly and re-assembly operations in these circumstances must be conducted in a tedious, painstaking manner with remotely handled tools and specially trained crews. This situation is further aggravated by the conflicting requirements for a structurally strong fuel element that is capable of withstanding about three years exposure to the extreme physical conditions within a reactor core, and nevertheless be readily dismantled through remote manipulations.

Because the need for structural integrity has been paramount, fuel element disassembly heretofore has involved the destruction of many of the components in order to remove, identify and separate those few fuel pins tht might require replacement. This is an expensive and wasteful process, especially in view of the high cost of these components. Thus, there is a need for a safe, efficient, and essentially non-destructive technique for dismantling fuel elements.

SUMMARY OF THE INVENTION

The invention generally satisfies this need for a non-destructive fuel element disassembly technique. Typically, a deep pool of ordinary water is provided at a nuclear power plant for temporarily storing used fuel elements. The water depth is sufficient to reduce the radiation from the stored elements to a safe level at the pool edge. In accordance with the invention, a traveling bridge spans the width of the pool. The bridge supports a generally parallel strongback that is immersed in the pool water. The strongback is pivoted or hinged on one end to the lower end of one of the pair of beams that protrude down into the water from the bridge. The free end of the strongback is attached to a winch-driven cable.

This structural arrangement enables the strongback to be swung selectively from a horizontal position that is parallel to the bridge down into a vertical position within the shielding water that is perpendicular to the span of the bridge. In this vertical position, the strongback accepts a complete fuel element and draws this element into a horizontal position for external inspection under the control of the winch and cable. Closed circuit television, "feeler gauges", periscopes, and the like, preferably are mounted on a trolley on the bridge to execute this external inspection. To examine all sides of the fuel element in question, moreover, it will be necessary (in the illustrative case of a fuel element that has a square, or rectangular cross section) to rotate the fuel element through 90° one or more times in order to insure that all four lateral sides of the element are exposed for inspection. To accomplish this rotation, the strongback is swung into the vertical position and the fuel element is released to stand erect in the strongback. A fuel element assembly handling tool is lowered from the trolley to engage the end fitting of the fuel element. The tool lifts the fuel element from the strongback and rotates the fuel element through a 90° angle before the tool returns the fuel element to the strongback. The entire hoisting and inspection process then is once more repeated with respect to the newly exposed side. Naturally, these steps may be repeated a number of times to expose and to examine all sides of the fuel element under study.

After these external inspections are complete, the fuel rods that are secured within the bundle also must be removed for individual examination, inasmuch as these interior rods are not subject to close observation from the outside of an assembled fuel element. As an initial step in the technique that characterizes this invention, the two end fixtures are released from the fuel element while it is in the vertical position. As fuel elements are presently constituted, end fixture removal might require remotely controlled cutting of a few small welds. The nature of this operation, however, will not irretrievably damage the end fixtures or the interposed fuel rods.

In order to remove individual fuel rods from the fuel element without damage, the grip between the protrusions that jut from the surfaces of the grid cells and the portions of the fuel rod surfaces that are in contact with these protrusions must be relaxed. These gripping forces are temporarily relieved by inserting long, thin bars that have rectangular cross sections through the individual grids. These bars are guided into appropriate grid slots by means of a plate that has cone-shaped apertures which align the bars with the grid slots. A remote manipulator inserts the rods through the plate and into the slots in the grid structure.

To relax the grip, the bars are rotated through 90° in order to press the long dimension of the rectangular bar cross section against the plates that form the cell surfaces and, in this manner, to push the jutting protrusions away from the associated fuel pin surfaces.

In accordance with another feature of the invention, the inserted bars are rotated through the 90° angle with the aid of a special grid cell opener tool. This tool has a pair of parallel sides that embrace opposite longitudinal surfaces of the fuel element in a transverse plane that coincides with the grid structure. A common selectively contractible member is disposed parallel to a third longitudinal side of the fuel element. This member joins the two opposing parallel sides together. A rack and pinion on the bar enable the opposing sides to move toward the adjacent grid and to engage the protruding edges of the rotatable bars in aligned nipples that are pivoted on the inner surfaces of the parallel sides. The protruding bar ends are securely received in matching rectangular slots in the nipples. The nipples, moreover, all are connected to respective cranks that are ganged to move in response to the motion that is produced by a further rack and pinion on the contractible member that joins the two parallel members together.

Moving the rack and pinion associated with the nipples rotates the ganged cranks through a 90° angle. This rotation brings the long dimension of the rectangular cross section to bear against the surfaces of the adjacent grid cell and presses the protrusions away from the respective fuel pin surfaces. Thus, the gripping forces that rigidly retain the fuel pins in their relative positions within the fuel element structure are relaxed.

The relaxed grip enables the fuel pins to be individually withdrawn without risk of damage from the fuel element structure. In the circumstances, a remotely controlled manipulator can remove the individual pins for inspection and reinsertion or replacement as necessary.

To reassemble the fuel element, the pins are replaced or reinserted into the grid structure, as the occasion demands. The ganged cranks are rotated back through the 90° angle in order to shift the long dimension of the rectangular cross section of the bars away from the grid cell surfaces. This movement of the bars releases the stresses that are imposed on the bars and enables the protrusions in the cells to once more jut forward and engage or grip the associated fuel pins. The unstressed bars within the grid structure can be individually extracted by means of a remote manipulator. The end fixtures also can be secured to the extremities of the fuel element. Screws and nuts, moreover, are reconnected with the aid of a conventional manipulator. Welds also can be restored through remote underwater manipulation of appropriate equipment.

The reassembled fuel element is ready to be reinserted into the reactor core or kept in the storage pool, as necessary.

In accordance with a further characteristic of the invention, the equipment used in these foregoing operations is portable and the entire disassembly and reassembly process is conducted without inflicting substantial damage to the structure and individual components of the fuel element. The portable nature of the tools used to carry out the invention enables a small crew of trained technicians to travel to different reactor sites and carry out efficient and generally non-destructive fuel element inspections. The need for expensive specially trained personnel and individual equipment at each reactor is overcome through the practice of the invention. Consequently, the invention provides a long step forward toward overcoming a major difficulty in the practical application of nuclear power.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS

Figure 1:
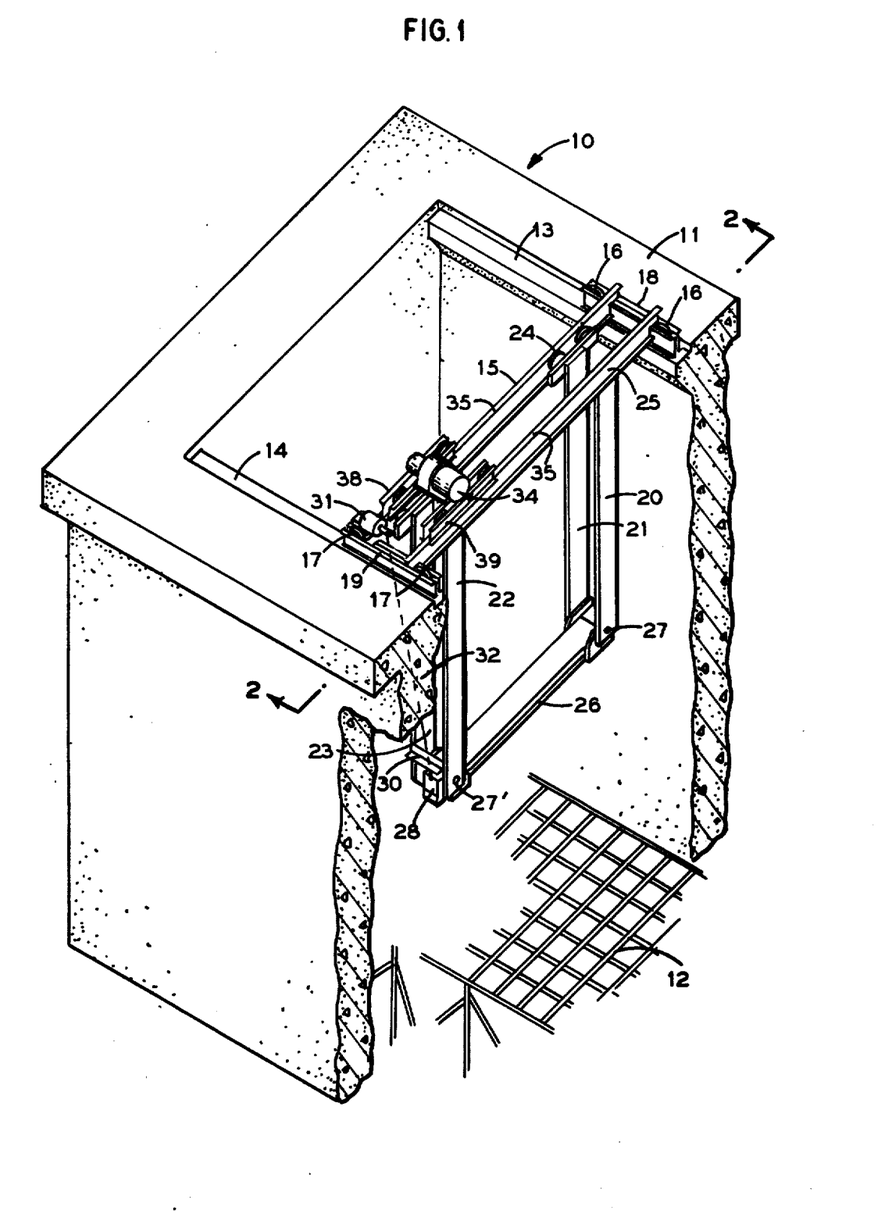
FIG. 1 is a perspective view in broken section of a portion of a typical spent fuel element storage pool with a bridge and trolley structure in accordance with the principles of the invention.

For a more complete appreciation of the invention, attention is invited to FIG. 1, which shows a spent fuel element pool 10. The pool 10 usually is filled with water (not shown in FIG. 1) that is confined in a reinforced concrete well 11. A steel framework or fuel element storage rack 12 is provided at the bottom of the generally rectangular pool 10 in order to support fuel elements (also not shown in FIG. 1). As hereinbefore mentioned, these fuel elements usually are withdrawn from a nuclear reactor core in a partially used or in a "spent" condition. In these circumstances, personnel protection and good radiation safety procedures require that adequate shielding should be provided to attentuate the radiation that is emitted because of the residual radioactivity in these fuel elements. According to accepted radiation safety standards, moreover, a 10-foot depth of water between the pool surface and the closest part of any used or spent fuel element is adequate for personnel protection. Applying this standard to the instant invention, it is clear that all the subsequently described manipulations must be accomplished under not less than a 10-foot depth of water.

Turning once more to FIG. 1 of the drawing, a track 13 is formed above the water level on the margin of the pool 10. The track 13, and an oppositely disposed parallel companion track 14, extend along the entire length of two opposing sides of the pool.

In accordance with a feature of the invention, a movable bridge 15 spans the surface of the pool between the tracks 13 and 14 in a direction that is perpendicular to the longitudinal orientation of these tracks. The extreme ends of the bridge 15, moreover, are rigidly secured to respective trucks 18 and 19 that support the bridge and enable it to travel on the tracks 13 and 14. The trucks 18 and 19 have sets of wheels 16 and 17, respectively, that roll on the tracks 14 and 13 and promote the bridge translation.

More specifically, the bridge 15 has depending members 20, 21, 22, and 23 that are secured to two parallel wide flange beams 24 and 25 that form the spanning portion of the bridge structure. The depending members 20, 21, 22, and 23 protrude downwardly into the water (not shown in FIG. 1). Within the pool 10, a strongback 26 is temporarily disposed in a direction that is below and generally parallel to the two beams 24 and 25. The strongback 26, however, is pivoted to the lower extremities of the depending members 20 and 21 by means of a pin 27, or the like. A horizontal stop 30 connects the depending members 22 and 23 and engages the upper free end of the strongback 26 in order to limit the travel of the strongback. The strongback and the depending members all are supported on wheeled carriages for span-wise movement on the lower flanges of the beams 24 and 25 of the bridge 15. This pivotal movement of the strongback 26 is controlled through the selective operation of a motor-driven winch 31, best shown in FIG. 2, and an associated cable 32. The cable 32 is wound and unwound on a drum that is driven by the winch 31 to raise and lower the free end of the strongback 26 as shown in broken and continuous lines. The winch 31 is, moreover, rigidly secured to the beam 24. The strongback 26 can be pivoted, moreover, from the depending members 22 and 23. To shift the pivotal point, the pin 27 (FIG. 2) can be withdrawn after a similar pin 27' has been inserted through the lower ends of the members 22 and 23. in this situation, moreover, the winch 31 and the cable 32 should be repositioned near the truck 18 (FIG. 1) and the cable 32 should be attached to the end of the strongback 26 that is nested between the depending members 20 and 21. Thus, the bridge enables the strongback 26 to be placed in a vertical position in either orientation.

It can be further seen in FIG. 1 that a trolley 34 is adapted to roll on tracks 35. The tracks 35 are formed on the upper flanges of the bridge.

Figure 2:
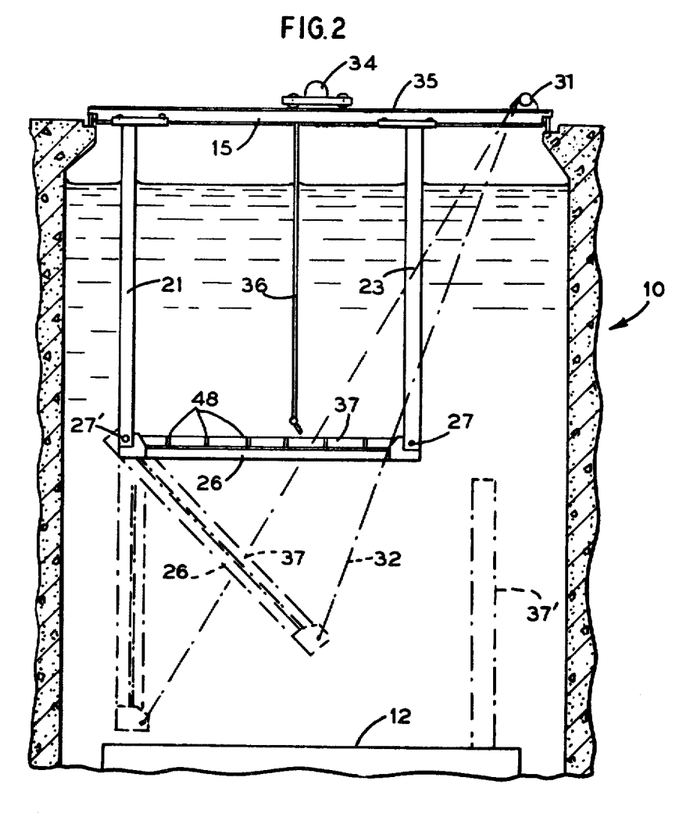
FIG. 2 is a front elevation in full section of a portion of the pool taken along the line 2—2 of FIG. 1 and looking in the direction of the arrow.

The trolley 34 also is equipped with a pair of wheeled trucks 38 and 39 (FIG. 1) that align the wheels in the respective trucks in alignment with the upper flanges of the beams 24 and 25. The trolley 34 extends across the gap between the two parallel beams 24 and 25 for the purpose of providing a movable equipment support. As shown in FIG. 2 for instance, submerged combination periscope and television camera 36 is supported on the trolley 34. As illustrated, the trolley in traversing the tracks 35 on the bridge 15 enables the periscope 36 to scan the exposed upper surface of a fuel element 37 that is lodged on the strongback 26. In this manner a thorough visual inspection of the exposed upper horizontal surface of the fuel element 37 can be carried out in safety under the prescribed 10-foot depth of water.

Naturally, the trolley provides a suitable support for other types of inspection devices, manipulators and remotely operated tools that are needed to complete the disassembly, inspection, and assembly of the fuel element 37 as described subsequently in more complete detail.

In operation, the depending members 20 and 21 remain stationary as the cable 32 is unreeled from the winch 31 to enable the strongback 26 to pivot from the horizontal, as shown in solid lines, to the vertical, as shown in broken lines. While the strongback is vertically erect, a crane (not shown) or other suitable remote manipulator lifts fuel element 37' (FIG. 2) that is designated for inspection from the storage rack 12. The crane nests or cradles the fuel element in the vertical strongback 26. Because the free end of the strongback 26 has an end plate 28 (FIG. 1) the lower end of fuel element 37 rests on that plate. In this manner, the fuel element 37 is supported in the erect position when the strongback is pivoted to the vertical. Mechanical clamps, bands or the like, (not shown in the drawing) are used to secure the fuel element 37 in the strongback 26. These bands preferably are applied with the aid of remote handling equipment, e.g., conventional pool tongs.

The winch 31 is activated to reel in the cable 32 and draw the free end of the strongback 26 from the vertical into the horizontal position as shown in solid lines in FIG. 2 of the drawing. The upper horizontal surface of the fuel element 37 is exposed for inspection through the combination television camera and periscope 36, "feeler" gauges and the like.

It will be recalled that the remaining three outer surfaces of the typical fuel element under consideration also should be exposed for inspection. To accomplish this purpose, the fuel element 37 and the strongback 26 should be once more lowered into the vertical position. The bands or clamps that secure the fuel element to the strongback must be loosened or released and the remote manipulator activated to withdraw the fuel element 37 from the strongback.

In the case of a fuel element that has an essentially square or rectangular cross section, the manipulator also rotates the fuel element through 90° in either direction, or through 180°, to expose one of the three remaining unexamined sides. After the fuel element has been rotated through an angle that is appropriate to the side to be exposed, the manipulator replaces the fuel element in the strongback 26 and the process of clamping, leveling, and inspecting is repeated once more.

All of these steps, including the rotation step, are repeated for each side until all of the exposed lateral sides of the fuel element have been subjected to an acceptable inspection.

Figure 4:
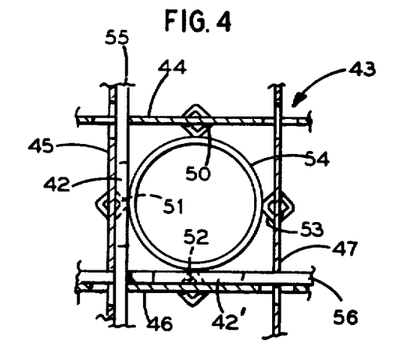
FIGS. 4 and 5 are plan views in full section of grid cells in a fuel element showing a typical application of the key illustrated in FIG. 3.

It will be recalled that the fuel rods that comprise most of the interior of the fuel element 37 also must be inspected. In the past, this need to examine the inner fuel rods imposed a requirement to destroy significant and expensive fuel element structural components. In this regard, FIG. 4 shows a portion of a typical cell 43 is one of the grids 48 (FIG. 2) that engages fuel rod 54. These grids are generally transverse to the longitudinal dimension of the individual fuel rods and are laterally spaced from each other. As described in more complete detail in U.S. Pat. No. 3,665,586 granted on May 30, 1972 to Felix S. Jabsen for "Nuclear Fuel Rod Supporting Arrangements," the grid is formed from a lattice of generally perpendicularly intersecting plates that establish an array of rectangular cells. Individual fuel rods are received in each of these cells. Small protrusions formed in the surfaces of the plates extend into the respective cells and bear against adjacent portions of the respective fuel rods surfaces in order to retain these rods in their relative positions and to suppress vibration or other undesirable motion.

To remove the fuel rods from the individual cells, slots are provided in the cell corners to permit a cell wall deflecting key to be inserted into the grid structure. As described in the aforementioned patent, the keys are rotated within the grid structure to enable bosses on these keys to press the protrusions back out of the respective cells. So arranged, the individual fuel rods can be inserted into the grid cells without risk of gouging or scoring. After the fuel rods are situated within the grid, the keys are rotated in a direction that will disengage the bosses from the cell surfaces and thus allow the protrusions on the cell walls to extend into the respective cells and press against adjacent fuel rod surfaces.

Remotely controlled withdrawal of the fuel rods from the grid structure for inspection purposes, however, can produce undesirable scratches and scoring on the rod surfaces unless some means is provided to relieve the forces that press the grid protrusions against the adjacent rods.

In accordance with a further characteristic of the invention this problem is overcome through the bridge 15 (FIG. 2). Once having mounted a fuel element on the strongback 26 and having inspected the external surfaces of the fuel element, as hereinbefore mentioned, it is frequently advisable to remove individual fuel rods from the assembly for individual inspection and replacement, as indicated. Prior to the instant invention, it was necessary to cut the grids apart with the aid of remote handling equipment in order to provide access to individual fuel rods without scraping or scoring the rod surfaces on the protruding grid detents that otherwise would occur if the rods had been pulled out of the grids in a longitudinal direction. In accordance with the invention, however, the individual rods can be removed from the fuel element structure in an essentially nondestructive manner.

For illustrative purposes, a fuel element of the type shown in my abandoned U.S. Pat. application Ser. No. 2,767 filed Jan. 14, 1970 for "Fuel Assembly For A Nuclear Reactor" will be used in connection with the description of the apparatus and methods that characterize this invention. As described in the 2767 patent application, each fuel element has an upper end grid and a lower end grid to receive and constrain the extreme ends of the fuel rods in the array. Fuel rod stability is enhanced by means of the fuel element grid structure that engages the rods in transverse planes in between the two end grids, as described in more complete detail in the aforementioned U.S. Pat. No. 3,665,586 patent.

Although the ends of the individual fuel rods are received in the upper and lower end grids, the lower grid is secured to the upper grid through an array of control rod guide tubes. These tubes extend through the entire fuel element to enable threaded ends to protrude from the upper surface of the upper end grid and to protrude from the lower surface of the lower end grid. Threaded nuts are received on these protruding guide tube ends and, in this manner, clamp the two end grids together and secure the fuel rods between the two end grids.

Accordingly, in order to dismount the fuel element 37 (FIG. 2) the fuel element is once more cradled in the horizontally disposed strongback 26. A conventional remote manipulator that is mounted on the trolley 34 is used to unscrew the nuts (not shown) that clamp together the upper and lower end grids (also not shown). For this purpose, Model MV-128 Pool tongs available from *Optics for Industry*, 1929 N. Buffum Street, Milwaukee, Wis. are suitable.

Continuing with the description of the fuel element disassembly, the nuts are removed and stowed within the pool 10 for subsequent use. The strongback 26 is once more lowered into an erect position. The pool tongs are then used to withdraw the control rod guide tubes and the upper end grid (not shown) from the fuel element 37.

At this point in the procedure, for radiological safety, care must be exercised to maintain a 10-foot depth of water between the surface of the pool 10 and that part of the guide tube which is closest to the pool water surface. The withdrawn control rods and the upper end grid also are stowed within the pool.

The now partially disassembled fuel element 37 is turned up-side-down to permit the lower end grid to face the surface of the pool water. In this position, the remote manipulator is used to remove the lower end grid from the fuel element and stow this lower end grid in some accessible place within the pool 10.

Depending on the specific design of the fuel element being disassembled, it may be necessary to once more rotate the element through 90° quadrants in order to expose all of the end grid nuts or fasteners to the grasp of the pool tongs. In a similar manner, tack welds that often are applied to prevent these fasteners from working loose during reactor operation also must be sliced through with remotely manipulated tools to allow the end grids and the control rod guide tubes to be withdrawn from the fuel element.

The partially disassembled fuel element now consists only of the array of fuel rods that are held in position by means of the transverse grids which were positioned on the rods at stations in between the upper and lower end grids.

In accordance with the invention, the strongback 26 (FIG. 2) raises the fuel assembly to a horizontal position in order to aid in releasing the grip that is established by the protruding grid detents on the fuel rods.

Figure 3:
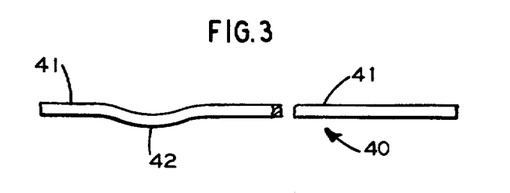
FIG. 3 is an illustrative drawing of a typical fuel element grid release key that is suitable for use with the present invention.

Attention is invited to FIG. 3 which shows a typical bar 40 for use in releasing this engagement between detents and fuel rod.

Preferably, the bar 40 has longitudinal shank portions 41 which are generally rectangular in transverse cross section. Protrusions 42 extend from the shank portions 41 of the bar 40 at regular intervals. Turning now to FIG. 4, a typical cell 43 in a larger grid structure (not shown in FIG. 4) comprises an array of four interlocking plates 44, 45, 46, and 47 that are spot welded at the mutually perpendicular intersections. Rigid detents 50, 51, 52, and 53 are stamped or formed in the respective surface of each of these plates. These detents protrude into the illustrative cell that is defined by the portions of the plates 44 through 47. The detents 50, 51, 52, and 53 rigidly engage the outer surface of the fuel rod 54 and serve to secure the rod 54 in proper relative position with respect to the array of rods and other structural components that comprise the fuel element (37 in FIG. 1). The bars 55 and 56 are inserted into the call 43 through apertures formed in the vertical sides of the plates 44 through 47 at the intersection of the plates 44 and 45, 46 and 45, and 46 and 47. The bars, as shown in FIG. 4, should be inserted into the cell 43 with the protrusions 42 and 42' oriented in a vertical direction that is perpendicular to the plane of the drawing. With the protrusions 42 and 42' so oriented, the apertures in the cell 43 provide a sufficient clearance to enable the bars 42 and 42' to enter the cell 43. The protrusions 42 and 42', moreover, are positioned close to the adjacent cell walls. Naturally, although the bars 55 and 56 must be sufficiently strong to deflect the cell walls, they also must be sufficiently slender to fit within the space between the fuel rod 54 and the adjoining plates 45 and 46, respectively. This clearance is established by the depth to which the respective detents 51 and 52 protrude into the cell 43. During bar insertion the protrusions 42 and 42' are not in engagement with the structure of the cell 43.

Figure 5:
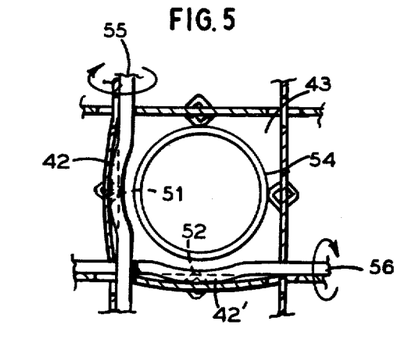

In order to relax the grip that the detents 50 through 53 apply to the fuel rod 54, and thus to enable the rod to be withdrawn from the grid structure without scoring, scraping, or otherwise marring the metal surface, attention is invited to FIG. 5. In FIG. 5 bars 55 and 56 are rotated through 90° in a clockwise direction about the respective longitudinal axes of the bars in the plane of the drawing as shown by the arrows in FIG. 5. This rotation aligns the protrusions 42 and 42' with the adjacent cell walls that support the associated detents 51 and 52. In this condition, the protrusions 42 and 42' press the detents 51 and 52 in order to deflect these detents out of the cell 43 and thereby disengage all of the detents 50 through 53 from the surface of the fuel rod 54. This apparently slight outward movement of the detents 51 and 52 is sufficient to allow the fuel rod 54 to be withdrawn from the cell 43 in the grid structure without abrading or scraping the fuel rod surface against the detents.

In another embodiment of the invention, however, the bar, or key 40, has a rectangular cross section. The short side of this rectangle is sufficient to slide through the gap between the protruding tip of one of the detents 50, 51, 52 and 53 and an associated one of the plates 44, 45, 46 and 47. The long side of the rectangle, moreover, must be large enough to deflect the adjacent plate a sufficient amount to release the rod 54 when the long dimension is rotated into contact with the plate.

This procedure is repeated for all of the cells in all of the grid structures that are in engagement with the fuel rods in the array. The rods, moreover, are individually withdrawn from the array. Illustratively, remotely operated pool manipulators are used to withdraw each fuel rod from the partially disassembled fuel element array.

Figure 6:
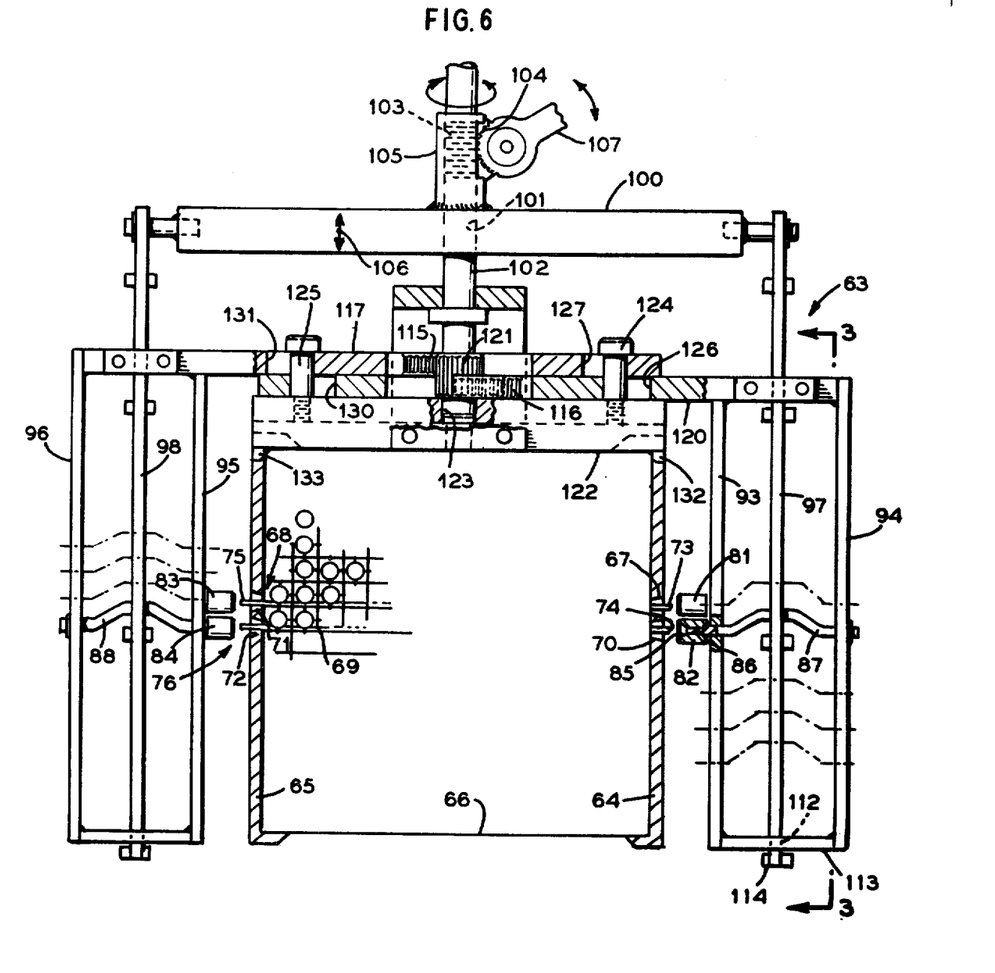
FIG. 6 is a front elevation of a grid cell opener for manipulating the keys that are shown in FIGS. 4 and 5.
Figure 8:
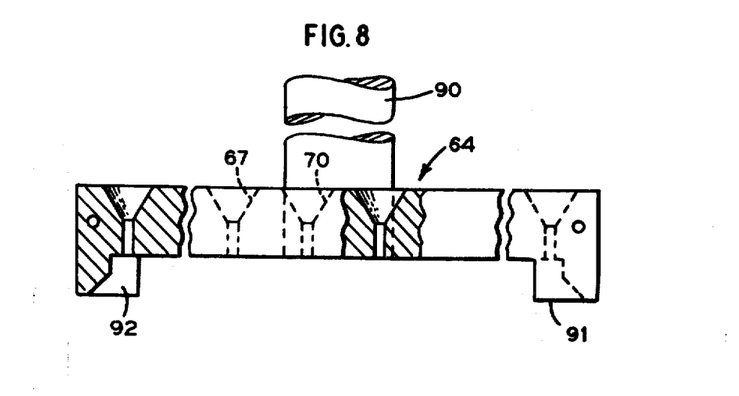
FIG. 8 is a plan view of a fixture for aligning the keys shown in FIGS. 3, 4, and 5 with the fuel element grid structure.

To improve disassembly efficiency and, in accordance with a further aspect of the invention, parallel flat camming plates 64 and 65 (FIGS. 6 and 8) are provided to engage two opposite and parallel sides of a grid 66. The camming plates 64 and 65, moreover, have conical openings 67, 70, 71, and 72 formed with the truncated apices of the individual cones pointing inwardly toward the sides of the grid 66. As shown in the drawing, bars 68 and 69 are essentially guided by the conical openings through the apertures at the grid plate intersection (not shown in FIG. 6, but shown in FIGS. 4 and 5). Thus, two pool manipulators each grasp a respective handle 90 (FIG. 8) on the two respective camming plates 64 and 65. The manipulators press the respective plates up against the grid 66 (FIG. 6). Alignment cams 91 and 92 (FIG. 8) on the plate 64 center the conical openings 67 and 70 with the corresponding apertures in the grid 66 (FIG. 6).

A third pool manipulator inserts bars end-first into the individual conical openings. The cones act as cams to guide the bars into the grid structure through rectangular slots formed at the truncated apices of each of the cones to establish the proper orientation relative to the grid structure that is shown in FIG. 4.

In order to rotate the bars 68 and 69 (FIG. 6) into the orientation that is shown in FIG. 5, the camming plates 64 and 65 are withdrawn and a fixture 63 embraces three of the four sides of the now bar-loaded grid 66. Bar-ends or terminal bar portions 73, 74, 75, and 76 protrude beyond the margin of the grid 66. For simiplicity of disclosure, however, the camming plates 64 and 65 are shown in contact with the grid 66 at the same time as the fixture 63. Mating nipples 81, 82, 83, and 84 on the fixture 63 are in alignment with the adjacent terminal bar portions. The nipples 81 through 84 are only shown as an illustrative group of four in a much larger nipple array that is mounted on the fixture 63.

As shown in connection with the nipple 82, each nipple has a truncated conical recess 85 that has a truncated apex oriented away from the grid 66. The conical recess serves as a further cam or guide that directs the adjacent terminal bar portion 74 into a female slot 86 that has a shape which matches the cross section of the terminal bar portion 74.

All of the nipples 81 through 84 are secured for pivotal movement to respective cranks that are essentially the same as two illustrative cranks 87 and 88. The crank 87, moreover, is journaled in two spaced-apart parallel plates 93 and 94. In a similar manner, the crank 88 also is journaled in two parallel spaced-apart plates 95 and 96.

The journaling described for the nipples 82 and 84 is, of course, repeated for all of the nipples on the fixture 63.

The pairs of journal plates 93 and 94, 95 and 96, form two rigid rectangles as seen in FIG. 6 of the drawing. The crank 87, as well as all of the other cranks (not shown) that are journaled in the plates 93 and 94, are ganged together for rotational movement by means of a connecting rod 97. A parallel connecting rod structure 98 is provided for the cranks that are journaled between the journal plates 95 and 96.

Movement is imparted to the connecting rods 97 and 98 (and hence, to the respective sets of nipples through the ganged cranks) by means of a yoke 100. The yoke 100 has a central aperture 101 that receives a shaft 102. The shaft 102, moreover, is pressed firmly against the side of the grid cell. The shaft 102 has a rack 103 that meshes with a pinion gear 104. The pinion gear is journaled in a collar 105 that is secured to the yoke 100. This structure enables the yoke 100 to move in the two linear directions as indicated by the double headed arrow 106. A lever 107 on the pinion gear 104 is manipulated by means of pool tongs, or the like, to drive the yoke in either direction along the shaft 102.

Figure 7:
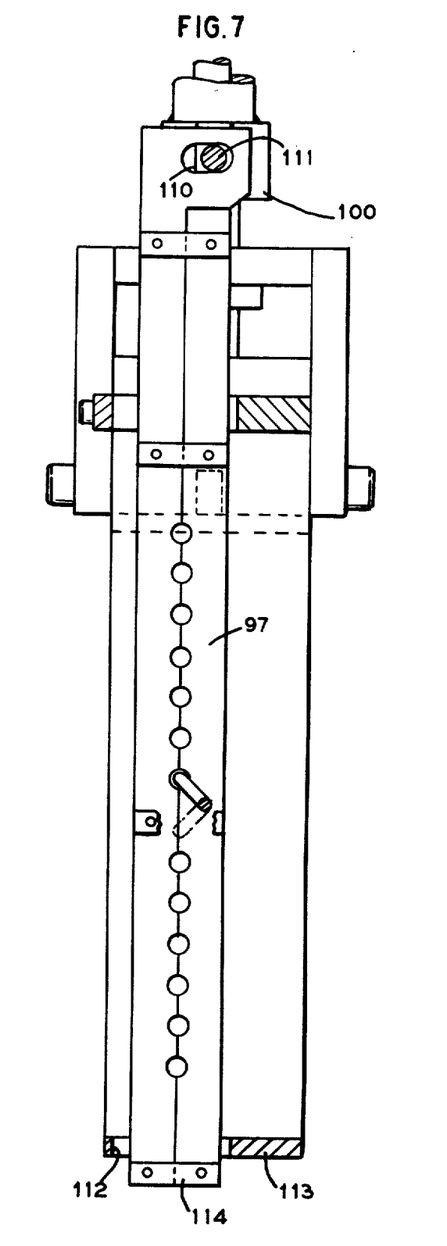
FIG. 7 is a side view in section of the grid cell opener, taken along the line 3—3 of FIG. 6 and looking in the direction of the arrows.

This limited movement of the yoke 100 is sufficient to enable the individual cranks to sweep through a 90° arc. As shown in FIG. 7, one end of the connecting rod 97 has a slot 110 that receives a pin 111 on the yoke 100 to accommodate the irregular or non-linear connecting rod movement. The other end of the connecting rod 97 is received in a slot 112 that is formed in a base 113 for the frame of journal plates 93, 94 (FIG. 6). The end of the connecting rod 97 (FIG. 7) that is received in the base 113 also has a stop 114 to insure that the connecting rod 97 does not disengage itself from the slot 112.

As described the combination of the connecting rod 97, pin 111, slot 110, and the slot 112 with the stop 114 enables the essentially reciprocating stroke of the yoke 100 to translate into the non-linear motion of the connecting rod and the associated cranks.

In accordance with the invention, a similar structural arrangement is provided for the cranks that are associated with the connecting rod 98 and the journal plates 95 and 96.

To mate the terminal bar portions 75, 76 (FIG. 6) of the bars 68 and 69 with the nipples 83 and 84 and to mate the nipples 81 and 82 with the terminal bar portions 73 and 74, a further pair of racks 115 and 116 on sliding members 117 and 120, respectively, are provided. These racks 115 and 116 mesh with a pinion gear 121 on the stub end of the shaft 102.

The sliding members 117 and 120 are arranged in an overlying, stacked relationship, the member 120 being sandwiched between the member 117 and a fixed, or immobile member 122. The member 122 not only provides a rigid support for the sliding members, but also has a recess 123 in which the stub end of the shaft 102 is journaled.

Guide pins 124 and 125 protrude from the member 122 through mating slots 126 and 127, respectively and slots 130 and 131. The slots 126 and 130 are formed in the sandwiched sliding member 120 and the slots 127 and 131 are formed in the outer sliding member 117. The pins 124 and 125 with their associated slots cooperate with the pinion gear 121 by driving the members 117 and 120 in opposite lateral directions for distances that are determined by the lateral dimensions of the particular slots. These slot dimensions, moreover, are of sufficient size to enable the fixture 63 to be positioned about three sides of the grid 66 without engaging the exposed ends of the bars 68 and 69, as shown in FIG. 6.

In operation, the shaft 102 is rotated to extend the sliding members 117 and 120 as far as possible in opposite lateral directions. The fixture 63 then is fitted around the grid 66, to embrace three sides of the grid. One side of the grid contacts the fixed member 122. As shown, the member 122 has a pair of guides 132 and 133 which align the fixture with the terminal bar portions 73, 74, 75 and 76. The shaft 102 is rotated to draw together the sliding member 117 and 120 and, in this manner, to engage the terminal bar portions within the adjacent female slot 86 of the nipples 81 through 84.

The rack 105 is formed on the shaft 102 as a sequence of gear teeth that completely circumscribe the shaft. In this way, rotation of the shaft 102 for the purpose of shifting the position of the sliding members 117 and 120 will not disengage the lever operated pinion gear 104 from the rack 105. To rotate the bars 68 and 69 through 90° in order to produce the bar orientation and detent relaxation that is shown in FIG. 5, the lever 107 is manipulated to drive the yoke 100 in a direction that is parallel to the axis of the shaft 102. This motion moves the connecting rods 97 and 98 with their respective sets of ganged cranks 87 and 88 through a 90° arc. This rotation is transmitted from the nipples 81 through 84 through the entire length of the bars 68 and 69, thereby partially "opening" the cells.

The shaft 102 (FIG. 6) is rotated in an opposite direction to shift the sliding members 117 and 120 as far apart as possible in a lateral direction. thus, the bars 68 and 69 are disengaged from the nipples, and the balance of the fixture 63. The fixture 63 now can be withdrawn from the grid 66 and the partially dismantled fuel element, and either set aside or used to rotate the bars in another grid on the fuel element.

It should be noted in FIGS. 4 and 5 that the bars, or the keys 55 and 56 intersect within the cell 43. In order to insert the second set of coordinate keys in the grid 66 (FIG. 6) the fuel element is once more placed on the strongback 26 (FIG. 2). The fuel element 37 is so positioned that the keys protrude from the grid in a vertical direction. Small clearance blocks (not shown in FIGS. 1 and 2) are secured to the strongback 26 to enable the fuel element to rest on these blocks and allow the ends of the keys to clear the horizontal surface of the strongback.

The camming plates 64 and 65 (FIG. 8) are placed against the vertical sides of the grid 66 and a coordinate set of horizontally disposed keys are inserted into the fuel element in the manner described above. After key insertion, the camming plates 64 and 65 are removed to enable the fixture 63 (FIG. 6) to embrace the grid 66. The alignment guides 132 and 133 (or a set of alignment guides that will provide clearance for the protruding ends of the vertical keys) position the fixture 63 on the grid 66 in proper position relative to protruding ends of the coordinate horizontal keys and the nipples 81 through 84. Appropriate recesses, for example, can be formed in the fixed member 122 to accommodate the vertical adjacent ends of the keys that protrude from the grid 66.

After the fixture 63 is aligned, the fixture and the horizontal array of keys are manipulated as described above to relieve the engagement between the detents 50 through 53 (FIGS. 4 and 5). The disassembly, inspection and reassembly proceeds as indicated.

In accordance with a further feature of the invention, the fixture 63 can be supported from the trolley 34 (FIG. 2) on the bridge 15 and remotely operated from the side of the pool 10.

With the relaxed grip between the cell detents and the respective fuel rods as hereinbefore discribed, pool tongs (not shown) are manipulated to withdraw the fuel rod 54 (FIG. 5) from the cell 43 in a direction that is perpendicular to the plane of the drawing.

To reassemble the fuel element from the individual components after inspection is complete, individual fuel rods 54 (FIG. 5), of which the rod shown is typical, are reinserted into the cells on the grids.

The fixture 63 (FIG. 6) is moved into place on the grid 66 and the nipples 81 through 84 are once more engaged with the bars 68 and 69. This is accomplished through rotation of the shaft 102 to draw together the sliding members 117 and 120.

The lever 107 is manipulated once more to operate the connecting rods 97 and 98 with their respective cranks. This manipulation rotates the bars 68 and 69

(FIG. 6) backward through 90° in a direction opposite to that which initially deflected the grid detents.

The shaft 102 (FIG. 6) is once more rotated to shift the sliding members 117 and 120 in a lateral direction that will disengage the nipples 81 through 84 from the bars 68 and 69. The fixture 63 is removed from contact with the grid 66 and is applied to the coordinate set of rods that are shown in FIGS. 4 and 5. The fixture by now is available for application to another grid or is placed aside in the pool 10 (FIG. 1) for subsequent transport to a new job site.

The now partially reassembled fuel element as lifted by means of a manipulator (not shown) and placed on end, if needed, to replace one of the fuel element end grids. The fuel element now is placed on the installed end grid and the other end grid also is added to the element. The control rod guide tubes are inserted through the end grids and the associated nuts are screwed on to the exposed threaded ends of these tubes. The fuel element is once more up-ended to enable the nuts to be threaded onto the exposed threaded ends of the guide tubes that protrude beyond the surface of the first-installed end grid.

The fuel element has been completely dismantled, inspected and reassembled without inflicting any appreciable damage on the individual components. Although the invention is described in connection with the inspection of full spent or partially consumed nuclear reactor fuel elements, the techniques disclosed herein are also applicable to the assembly and inspection of new fuel elements.

The embodiments of the invention which an exclusive property or privilege is claimed are defined as follows:

1. A fixture for dissasembling and assembling a fuel element that has an array of longitudinally disposed fuel rods that are engaged in transverse grids comprising a fixed member for contacting the margin of one of the grids and aligning the fixture with the grid, a pair of relatively slidable members supported on said fixed member for lateral movement relative to said fixed member, first and second journal plates each attached to a respective one of said pair of relatively slidable members, two arrays of cranks, each of said arrays journaled in a respective one of said first and second journal plates, a plurality of nipples, each of said nipples having means formed therein and coupled to a respective one of said cranks for movement therewith for selectively engaging a respective portion of said fuel element, said nipples with each of said crank arrays being spaced opposite from each other and laterally movable in response to the motion of said slidable members to move said respective fuel element portions, a pair of connecting rods, each of said rods being individual to one of said crank arrays for ganging each array to move together, and yoke means joining said connecting rods for activating said ganged crank arrays and coupled nipples.

* * * * *